United States Patent [19]
Lee et al.

[11] Patent Number: 5,617,398
[45] Date of Patent: Apr. 1, 1997

[54] IN-LINE OPTICAL PICKUP USING WOLLASTON PRISM AND COLLIMATING LENS DIRECTING POLARIZED LIGHT COMPONENTS TO DETECTORS

[75] Inventors: Chul-woo Lee, Seoul; Jong-sam Jeong, Suwon; Eung-ho Kim, Seoul, all of Rep. of Korea

[73] Assignee: Samsung Electronics Co., Ltd., Kyungki-do, Rep. of Korea

[21] Appl. No.: 609,003

[22] Filed: Feb. 29, 1996

Related U.S. Application Data

[63] Continuation of Ser. No. 172,918, Dec. 27, 1993, abandoned.

[30] Foreign Application Priority Data

Apr. 30, 1993 [KR] Rep. of Korea .................. 93-7481

[51] Int. Cl.[6] ............................................ G11B 7/00
[52] U.S. Cl. ................... 369/110; 369/44.23; 369/112
[58] Field of Search ........................ 369/13, 44.23, 369/44.24, 54, 110, 112

[56] References Cited

U.S. PATENT DOCUMENTS

| | | | |
|---|---|---|---|
| 4,689,479 | 8/1987 | Tatsuno et al. | 369/112 X |
| 4,904,856 | 2/1990 | Nagahama et al. | 369/44.23 X |
| 5,050,155 | 9/1991 | Kurata et al. | 369/112 |
| 5,172,368 | 12/1992 | Lehureau | 369/112 |
| 5,189,655 | 2/1993 | Ogata et al. | 369/44.23 |
| 5,202,869 | 4/1993 | Miyake et al. | 369/44.23 |
| 5,258,967 | 11/1993 | Strasser et al. | 369/44.23 |

FOREIGN PATENT DOCUMENTS 5144031   6/1993   Japan .

*Primary Examiner*—W. R. Young
*Attorney, Agent, or Firm*—Leydig, Voit & Mayer

[57] ABSTRACT

An optical pickup includes a Wollaston prism for passing incident light generated from a light source and splitting reflected light from an optical disk into two polarized components, and two photodetectors for receiving the split reflected light beams, thereby simplifying and miniaturizing the apparatus.

6 Claims, 2 Drawing Sheets

IN-LINE OPTICAL PICKUP USING WOLLASTON PRISM AND COLLIMATING LENS DIRECTING POLARIZED LIGHT COMPONENTS TO DETECTORS

This disclosure is a continuation of patent application Ser. No. 08/172,918, filed Dec. 27, 1993, now abandoned.

BACKGROUND OF THE INVENTION

The present invention relates to an optical pickup for optically writing and reading information by projecting light onto an optical recording medium and detecting the light reflected therefrom, and particularly, to an optical pickup which can be subminiaturized.

Along with the practical use of information processing apparatuses for optically processing information, demand has recently increased for a lightweight and miniaturized optical pickup assembly which is the heart of such an apparatus. A lightweight and miniaturized optical pickup is preferable because it enables high-speed processing of information as well as the miniaturization of the information processing apparatus as a whole.

In the optical pickup, its weight and volume can be contracted by reducing the number of optical elements, which are disposed on an incident light traveling path from the light source of an optical system to an optical recording medium and on a reflecting light traveling path From the optical recording medium to a photodetector, so as to have as few as possible, and by optimizing their arrangement.

In general, such an optical pickup, as shown in FIG. 1, is constructed to have a light emitting portion A made up of elements located along a light path from a light source 1 for generating light to an optical disk 5 via an objective lens 4, and a light receiving portion B having a plurality of elements placed along a light path from optical disk 5 to a plurality of photodetectors 7, 8 and 9. Here, a light splining prism 2 of light emitting portion A is to split the light of light source 1 so as to converge part of the light onto a photodiode 3 to be used as a monitor. A light splitting prism 6 of light receiving portion B is to divide and transmit the reflected light of prism 6 to photodetectors 7, 8 and 9. Since light source 1 and the photodetectors 7, 8 and 9 are disposed far apart from each other, such an optical pickup using the light splitting prism 2 and 6 needs ample space and is therefore hard to miniaturize.

Japanese Laid-open Patent Publication hei 5-144031 discloses an optical pickup in which a plate having two parallel half mirrors is used to dispose one of the photodetectors closer to the light source, thereby miniaturizing the optical pickup. Since, however, another photodetector is still far from the light source this technology has a limit in its miniaturizing of the optical pickup.

In addition, for the miniaturization of an optical pickup, a technology using a hologram device has been known (though specific references are not cited herein). A hologram device performs a wave-plane conversion function in which one wave inducts the other between two waves used during the recording of a hologram pattern. As an alternative to the light splitting prism, the hologram device is particularly advantageous in that it can form the path of the reflected light at a slant with respect to the path of the incident light and therefore can reduce the occupied space and number of elements of the optical pickup. In the hologram lens, however, since the change of position of light passing the hologram is great according to the wavelength change of the used light, errors take place frequently. This impedes the practical use of holograms.

SUMMARY OF THE INVENTION

Therefore, it is an object of the present invention to provide an optical pickup in which a light source and photodetectors are located closer together, the number of elements are decreased, and the arrangement of which is optimized to attain subminiaturization.

To accomplish the object, there is provided an optical pickup for writing and reading information from an optical recording medium, comprising: a light source for generating incident light toward the optical recording medium; an objective lens for converging the incident light on the optical recording medium; a Wollaston prism disposed between the light source and objective lens for passing the incident light unimpeded and splitting the reflected light from the optical recording medium into P and S polarized components; and a plurality of photodetectors for receiving the reflected light of the optical recording medium split by the Wolladton prism.

In order to separate a reflected light path from an incident light path, the present invention uses a Wollaston prism instead of a light splitting device such as a conventional half mirror or beam splitting prism. Different from a hologram lens having the aforementioned wave-plane converting function, since the Wollaston prism splits reflected light into P- and S-polarized beams, it does not cause such problem as the change of light position due to the change of light wavelength and splits the light along a path slanted with respect to the incident light. This allows the photodetectors, which receive the reflected light, to be located adjacent to the light source.

BRIEF DESCRIPTION OF THE DRAWINGS

The above object and other advantages of the present invention will become more apparent by describing in detail a preferred embodiment thereof with reference to the attached drawings in which.

DETAILED DESCRIPTION OF THE INVENTION

Figure 1:
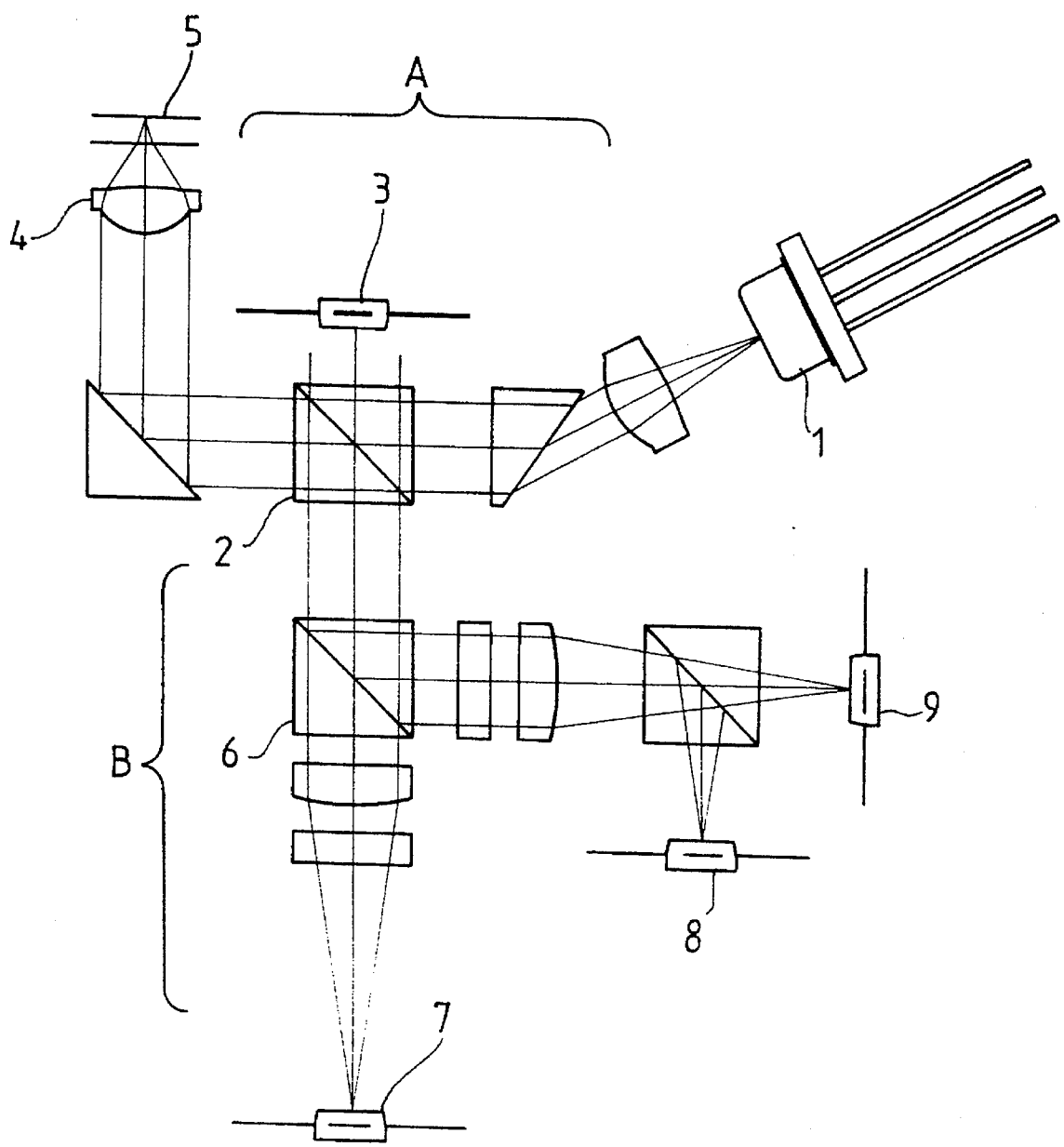
FIG. 1 is an arrangement view illustrating the optical configuration of a conventional optical pickup.
Figure 2:
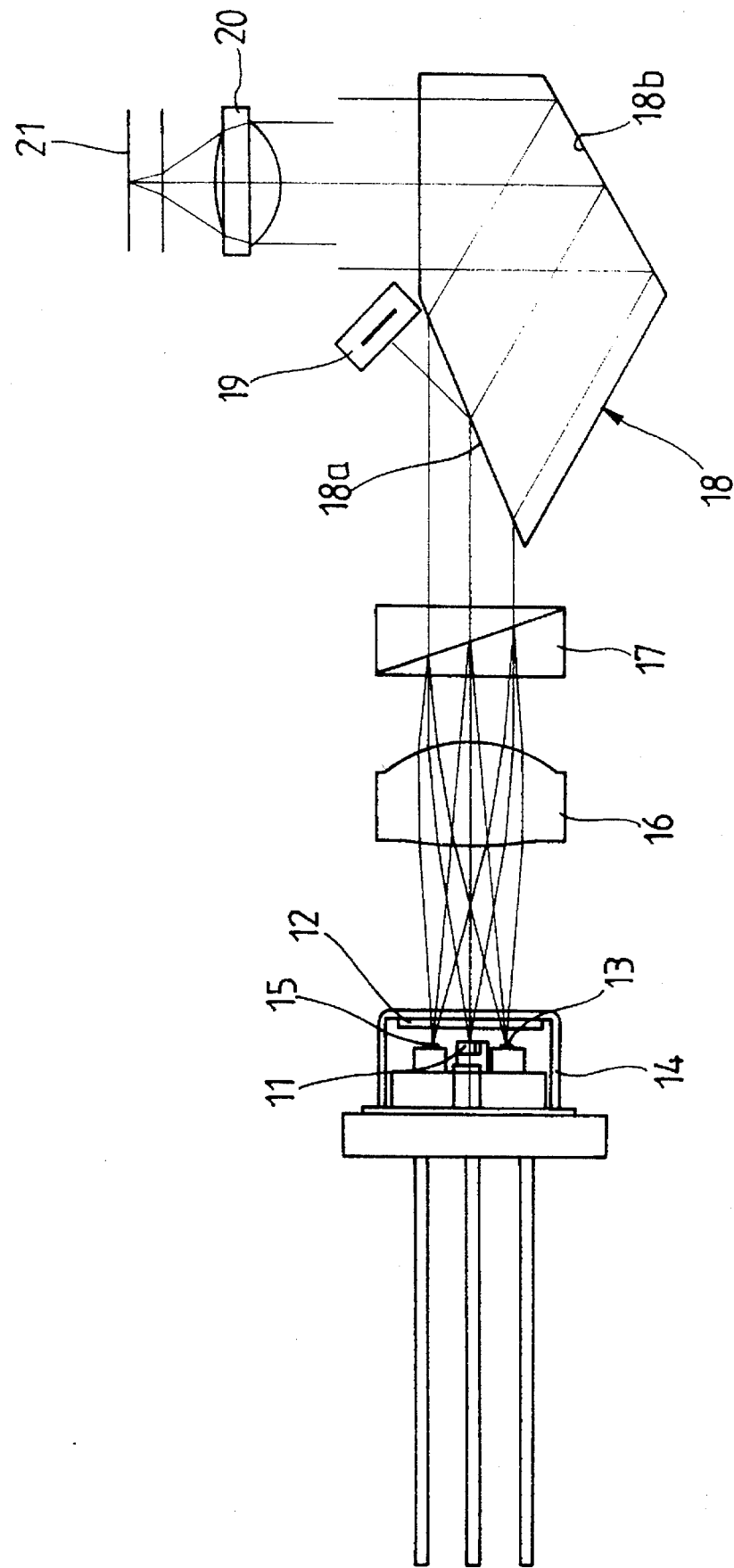
FIG. 2 is an arrangement view of the optical configuration of an optical pickup according to the present invention.

Referring to FIG. 2, reference numeral 11 denotes a laser diode for use as a light source. Two photodetectors 12 and 13 are placed on the flanks of laser diode 11. A housing 14 embraces laser diode 11 and two photodetectors 12 and 13. Housing 14 has a window 15 in its forward portion. Along the incident light path from laser diode 11 to an optical disk 21 are sequentially disposed a collimating lens 16 for advancing an incident light directed toward optical disk 21 from laser diode 11 in parallel with the optical axis, a Wollaston prism 17 for passing the parallel incident light and splitting the reflected light returning from optical disk 21 into P- and S-polarized components so as to be slanted with respect to the incident light, a shaping prism 18 for shaping the section of the incident light into a circle from an ellipse and an objective lens 20 for converging the incident light on optical disk 21. Here, shaping prism 18 has a half-mirror surface 18a which transmits part of the incident light while reflecting part thereof, and a reflecting surface 18b which reflects the incident light having passed through half-mirror surface 18a to objective lens 20. The incident light reflected by half-mirror surface 18a is received by photodiode 19 for use as a monitor.

The operation of the optical pickup will be explained in detail along the light traveling path of the optical pickup.

The incident light emitted from laser diode 11 passes through window 15 of housing 14, and is changed into parallel light by collimating lens 16. The parallel light continues to travel straight via Wollaston prism 17. The parallel light is shaped to have a circular cross section by shaping prism 18. The light having the circular crosssection passes through objective lens 20 which converges the light onto optical disk 21.

The reflected light from optical disk 21 passes through objective lens 20, shaping prism 18 and Wollaston prism 17. Different from the case in which the incident light travels straight, the reflected light restriking Wollaston prism 17 is split into two polarized components whose wave planes are perpendicular to each other on a slanted path; one being a P-polarized light beam and the other being an S-polarized light beam. The two polarized components are converged by collimating lens 16. According to the feature of the present invention the P- and S-polarized light of the reflected light converged by collimating lens 16 concentrates on two photodetectors 12 and 13 located near each other on the top and bottom of laser diode 11, respectively.

The light spots of the P- and S-polarized beams of the reflected light formed on the two photodetectors 12 and 13 by collimating lens 16, are varied in diameter when optical disk 21 vibrates vertically. When optical disk 21 vibrates horizontally, the landing position of the light spots is shifted. Accordingly, the detection of vertical and horizontal vibrations of the optical disk, i.e., a focus/track error signal of objective lens 20 can be carried out according to the size and landing position of the light spots formed on the photodetectors, as well as the detection of a signal for reproducing the information of optical disk 21 from the two photodectors 12 and 13. In the optical pickup of this invention, since the two photodetectors 12 and 13 receive the P- and S-polarized components of the reflected light, the recording and playback of information is possible on an optical recording medium.

As described above, in the optical pickup of the present invention, since Wollaston prism 17 splits the reflected light at a slant with respect to the incident light, photodetectors 12 and 13, which receive the reflected light, can be located close to laser diode 11 and form a package therewith while being contained within housing 14. Further, the present invention allows all the optical elements, from the laser diode to the optical disk, to be disposed in line. Ultimately, the present invention uses a Wollaston prism instead of the conventional light splitting prism so as to reduce the number of optical elements while optimizing the arrangement thereof. This accomplishes a simplified and inexpensive miniaturized optical pickup.

What is claimed is:

1. An optical pickup for writing and reading information from an optical recording medium, comprising:

a light source for generating incident light toward said optical recording medium:

an objective lens for converging said incident light on said optical recording medium;

a Wollaston prism disposed between said light source and objective lens for passing said incident light from the light source unimpeded along an optical axis of the light source and splitting the reflected light from said optical recording medium into P- and S-polarized components off the optical axis;

a plurality of photodetectors which are placed on the flanks of said light source for receiving the P- and S-polarized components of the reflected light of said optical recording medium split by said Wollaston prism, respectively;

a collimating lens placed between said light source and said Wollaston prism for placing said incident light in parallel with an optical axis and for condensing the P- and S-polarized components onto the plurality of photodetectors;

a shaping prism placed between said Wollaston prism and said objective lens for shaping a cross-section of incident light such that the cross-section is circular; and a housing which confines said light source and photodetectors.

2. An optical pickup for writing and reading information from an optical recording medium, comprising:

a light source for generating incident light toward the optical recording medium along an incident light path;

an objective lens for converging the incident light on the optical recording medium and for passing light reflected from the optical recording medium so that the reflected light travels substantially parallel to the incident light path;

a first prism disposed in the incident light path between said light source and said objective lens, said prism passing the incident light unimpeded along the incident light path and splitting the light reflected from the optical recording medium into P and S polarized components directed aslant from the incident light path;

a plurality of photo detectors disposed on the flanks of said light source and arranged to receive the P and S polarized components of the light reflected from the optical recording medium and passed through said objective lens; and a collimating lens disposed between said light source and said first prism for placing the incident light in parallel with an optical axis and for condensing the P and S-polarized components of the light reflected from the optical recording medium onto the plurality of photodetectors.

3. An optical pickup as claimed in claim 2 further comprising a second prism disposed in the incident light path between said first prism and said objective lens such that the incident light enters said second prism and a cross-section of the incident light is shaped such that the cross-section of incident light is circular.

4. An optical pickup as claimed in claim 3 wherein the second prism includes a half-mirror surface that reflects a portion of the incident light.

5. An optical pickup as claimed in claim 4 wherein said second prism includes a reflecting surface positioned to reflect light transmitted by the half-mirror surface in the direction of said objective lens.

6. An optical pickup as claimed in claim 5 further comprising a photodetector disposed to receive light reflected by the half-mirror surface.

* * * * *